United States Patent [19]

Peterson

[11] 4,198,551

[45] Apr. 15, 1980

[54] TIMER

[76] Inventor: Roy E. Peterson, 2330 N. 67th St., Lincoln, Nebr. 68507

[21] Appl. No.: 901,317

[22] Filed: May 1, 1978

[51] Int. Cl.$^2$ .......................... H01H 43/10; H04B 1/06

[52] U.S. Cl. .................................. 200/33 R; 200/38 F

[58] Field of Search ...................... 200/35 R, 36, 37 R, 200/38 A, 38 F, 38 FA, 38 FB, 38 D, 38 DA, 38 DB, 38 DC, 39 R; 325/389, 395, 396

[56] References Cited

U.S. PATENT DOCUMENTS

| | | | |
|---|---|---|---|
| 2,308,037 | 1/1943 | Abadjieff | 200/39 R |
| 2,671,165 | 3/1954 | Gilpin et al. | 325/389 X |
| 2,863,996 | 12/1958 | Hill et al. | 200/38 D X |
| 2,916,570 | 12/1959 | Nakamura | 200/38 F |
| 2,946,902 | 7/1960 | Hagen | 200/38 F X |
| 2,966,278 | 12/1960 | Drury | 200/38 F X |
| 3,032,618 | 5/1962 | Johnson | 200/38 F |

*Primary Examiner*—James R. Scott

*Attorney, Agent, or Firm*—Vincent L. Carney

[57] ABSTRACT

To turn off a television set for a selected period of time during a commercial and have it automatically turned on after that time, a timer includes a telephone-type dial outside of the front panel which turns a ratchet-cam wheel inside the housing of the timer. The ratchet-cam wheel includes a plurality of notches in its rim and a plurality of posts corresponding to the openings in the telephone dial and to periods of time, with a push-button switch being closed when the telephone dial is in its initial position by a large notch in the rim of the ratchet-cam wheel and opened when it is displaced from that position. To disconnect the television set, a timer motor drives a spring-biased ratchet wheel so that turning the dial moves the posts past the teeth of the ratchet and opens the switch and the timer motor turns the teeth of the ratchet to slowly move the dial back into position where the switch is closed.

11 Claims, 8 Drawing Figures

FIG. 1
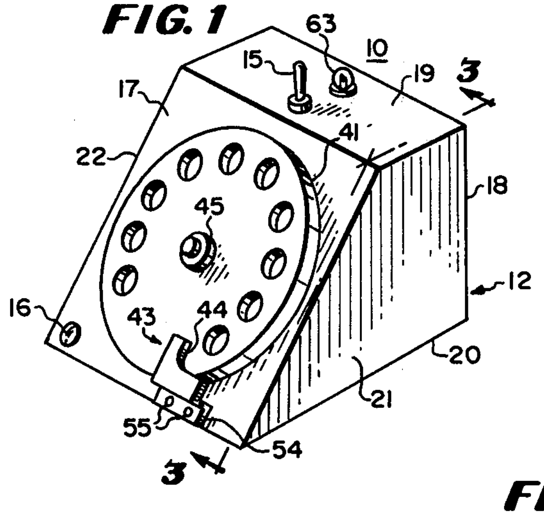
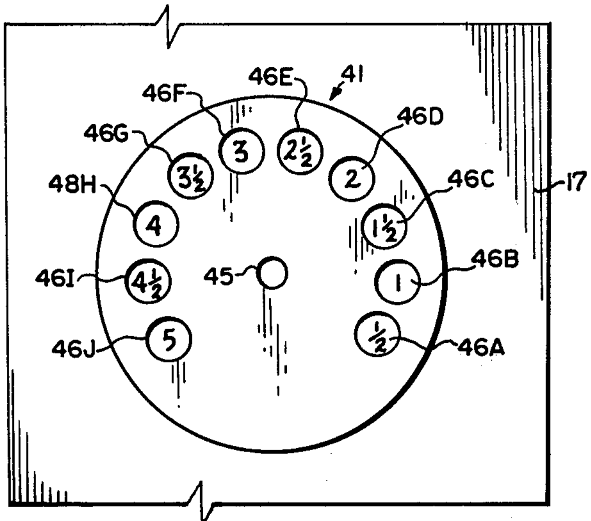
FIG. 2
FIG. 3
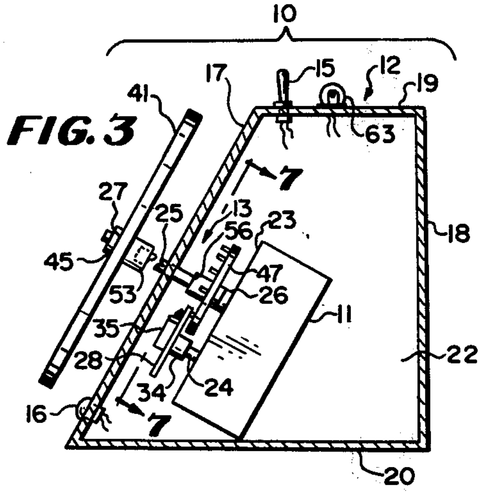
FIG. 4
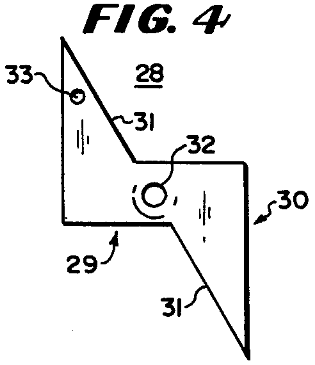
FIG. 5
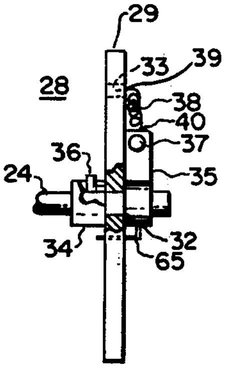
FIG. 6
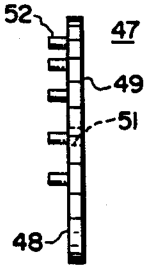
FIG. 7
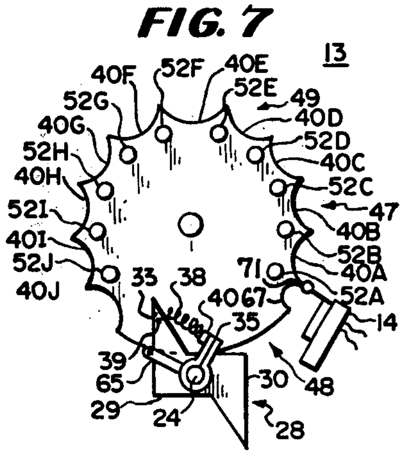
FIG. 8
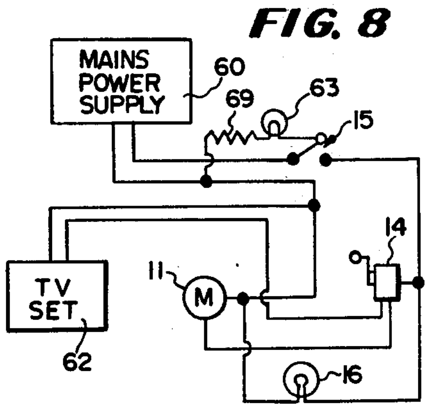

TIMER

BACKGROUND OF THE INVENTION

This invention relates to timing apparatuses for turning off electrical equipment for predetermined periods of time, such as for example, turning off a television set for the time duration of a commercial.

In one class of timing apparatus, a timer is set to disconnect electrical apparatuses such as television or radio sets for a fixed period of time and then to turn the equipment back on. This equipment includes a means for preprogramming the time delay, a timing motor and a switch which is controlled by the timing motor and the preprogramming device to control the power to the electrical equipment. Examples of this type of prior art apparatus are disclosed in U.S. Pat. Nos. 2,671,165; 3,870,956; 3,054,038; 3,424,865; 3,649,783; 2,520,732 and 3,569,839.

In a prior art system of the above class, electrical switches are set to determine when the electrical apparatus will be on and when it will be off. For example, slots may be cut in a rotating disk with conductive material underneath. Electrical contact made through the disk where the insulating material is cut away to complete a circuit for providing power to a television set as it is rotated by a timer motor. The prior art types of apparatuses have the disadvantages of being expensive and difficult to program.

SUMMARY OF THE INVENTION

Accordingly, it is an object of the invention to provide a novel timer.

It is a further object of the invention to provide a novel timing device whereby a fixed period of time may be set for equipment to be turned off, at the end of which period of time it is automatically turned on.

It is a still further object of the invention to provide a novel timing apparatus for turning off a television set for a selected time interval, such as during commercials.

It is a still further object of this invention to provide a timing apparatus which is manufactured from readily-available, economical materials.

It is a still further object of this invention to provide a timing apparatus which has a minimum number of parts.

It is a still further object of this invention to provide a timing apparatus which is easily set.

In accordance with the above and further objects of the invention, a timer includes a front panel and a moveable time-setting dial in front of the panel which dial is adjustable to a predetermined time period. It is connected to a cam-ratchet wheel on the other side of the front panel to position the cam-ratchet wheel in a position corresponding to the set time. A timer motor drives a ratchet arm so that after the dial has been set to a particular time on the front panel, the ratchet arm returns the cam-ratchet wheel and the dial back to their original positions. In its original position, the cam-ratchet wheel closes a switch to apply power to a television set or similar types of equipment and in other positions the switch is opened by the cam on the cam-ratchet wheel.

To operate the timer, the dial is moved to a position corresponding to a specific amount of time by the user. This movement opens the switch through which power is normally applied to the television set, thus turning the set off. The timer motor operates the drive ratchet to return the dial at a predetermined rate to a position in which power is again applied to the television after the selected time period.

As can be understood from the above description, the timer of this invention has the advantages of being: (1) simple, (2) economical in construction; and (3) relatively easy to program.

BRIEF DESCRIPTION OF THE DRAWINGS

The above-noted and other features of the invention will be better understood from the following detailed description when considered with reference to the accompanying drawings in which:

FIG. 1 is a perspective view of a timer in accordance with an embodiment of the invention;

FIG. 2 is an elevational view of a portion of the embodiment of FIG. 1;

FIG. 3 is a sectional view taken through lines 3—3 of FIG. 1;

FIG. 4 is an elevational view of a portion of the embodiment of FIG. 1;

FIG. 5 is a side view of a portion of the embodiment of FIG. 1;

FIG. 6 is a side view of another portion of the embodiment of FIG. 1;

FIG. 7 is a front elevational view of a portion of the embodiment of FIG. 1; and FIG. 8 is a schematic circuit diagram of a portion of the embodiment of FIG. 1.

DETAILED DESCRIPTION

In FIG. 1, there is shown a timer 10 having a housing 12 with an inclined front, rectangular panel 17, parallel rectangular horizontally-positioned top and bottom panels 19 and 20 intersecting the front panel 17 at their front edges, a rectangular vertical back panel 18 connecting the top and bottom panels 19 and 20 at their back edges and right and left side panels 21 and 22 cooperating with the other panels to form a complete enclosure.

To permit a user to set the time on the timer, a rotatable, circular, flat dial 41 is mounted parallel to the front panel surface 17 adjacent to a finger stop 43, with the dial 41 and finger stop 43 being similar to those of desk telephones. The dial 41 rotates about a center aperture 45 and includes a plurality of circumferentially-shaped holes for receiving a finger of a user so that the user may insert his finger into a selected hole and turn the dial 41 until his finger hits the finger stop 43. A switch lever 15 extends upwardly from the top panel 19 to permit the timer to be turned on and off.

The finger stop 43 is a flat metal member having a curved cut-away section at 44 and a bottom portion 54 adapted to receive two threaded fasteners 55 for mounting to the front panel 17 with the curved cut-away section 44 being in front of the path of the circumferentially-spaced apertures of the dial 41 to stop the finger of the user turning the dial 41.

As best shown in FIG. 2, there are 10 circumferentially-spaced apertures 46A–46J near the outer edge of the dial 41 circumscribing a center aperture 45. Each of the apertures 46A–46J represents a different time period and is spaced apart from the adjacent apertures at $\frac{1}{2}$ minute increments, with the aperture 46A representing $\frac{1}{2}$ minute, the aperture 46B indicating one minute and so on to the aperture 46J which indicates five minutes. The dial 41 in the preferred embodiment has a radius of approximately 1½ inches and the circular openings 46A–46J cover approximately 240° of the radius, being spaced center-to-center from each other at approximately 24° increments with their centers being approximately 1¼ inches from the center of the dial 41. They are approximately ½ inch each in diameter and the nearest opening from the finger stop is approximately 1½ inches therefrom.

In operation, the timer is turned on from the switch lever 15, causing the indicator lamp 63 (FIG. 1) to be extinguished and the indicator lamp 16 (FIG. 1) to be illuminated. The timer may be turned off by the same toggle lever and the lamp 16 is then extinguished and the lamp 63 illuminated so that the lamp 63 is on when the television set is off and the lamp 16 is on when the television set is on.

While the timer is on, a selected time period may be dialed to turn off the television set during a commercial. This is done at the beginning or just before the commercial by inserting a finger or other object in one of the apertures 46A–46J corresponding to the time for the commercial and dialing that aperture to the finger stop 43. This causes the television set to be turned off until the selected time period is over at which time the televison set is again turned on.

While a specific type of dial and on-off switch are shown in FIG. 1, it is to be understood that there are many other types of on-off switches and devices for selecting a time period. For example, a push-button switch could be used to turn the power on and off and another settable dial other than the telephone-style dial could be used. Essentially, the dial must only be a simple device for hand adjusting an interval member to an easily selected predetermined time period.

In FIG. 3, there is shown, in combination with the housing 12 and dial 41, a presettable timer switch assembly 13 and a timer motor 11 for controlling the presettable timer switch assembly 13. The presettable timer switch assembly 13 is connected to the dial 41 through a shaft 25 and to the timer motor 11 through a drive shaft 24, with the shafts 25 and 24 being parallel to each other.

To connect the presettable timer switch assembly 13 to the dial 41, the shaft 25 extends through the angled front panel 17 in a direction orthogonal thereto with an inward end 26 of the shaft having external threads which engage internal threads of a central aperture in the presettable timer switch assembly 13, being held thereto by the lock nut 56 and having a second end with external threads engaging an internally-threaded tapped hole at 45 in the dial 41 and being held thereto by the lock nut 53 and the nut 27 on opposite sides of the dial 41.

To mount the presettable timer switch assembly 13 to the motor 11, the output drive shaft 24 of the motor 11 rotatably engages an aperture in the presettable timer switch assembly 13 and is held thereto by split-collar clamp 35 and bushing 34. The presettable timer switch assembly 13 includes a ratchet gear 28 which engages the shaft 24 and a ratchet wheel 47 which engages the shaft 25. A push-button (not shown in FIG. 3) engages the ratchet wheel 47 as will be described hereinafter in connection with FIG. 7.

The timer motor 11 is a one-rpm synchronous motor mounted by any suitable means within the housing 12 having its front face 23 parallel to the ratchet gear 28, the ratchet wheel 47, the front panel 17 and the dial 41, its output shaft 24 engaging the ratchet gear 28 and its front surface 23 supporting the shaft 25 at its inner end.

In FIG. 4, there is shown a plan view of the ratchet gear 28 which is an integrally-formed flat member having a central aperture 32 for receiving the shaft 24 and two integrally-connected portions shaped as right triangles 29 and 30 with their hypotenuses being aligned along a single line 31 which passes through the center of the central aperture 32. A second aperture 33 is located near the tip of the right triangle portion 29.

As best shown in FIG. 5, the ratchet gear 28 is rotatably mounted to the shaft 24 by a bushing 34 on its inner side and a split-collar clamp 35 on its outer side, which hold the gear 28 axially in position on the shaft 24. The bushing 34 is held to the shaft 24 by any suitable means 36 and the split-collar clamp 35 is torqued into fixed engagement with the drive shaft 24 by a bolt 37. A follow-up arm 65 is rigidly mounted to the split-collar clamp 35 and extends downwardly below and adjacent to the ratchet gear 28.

To bias the ratchet gear 28 in the direction of rotation of the shaft 24, a tension spring 38 has its first end 39 attached to the triangle 29 within the aperture 33 by crimping or other suitable means and its second end 40 frictionally engaged between the bolt 37 and the split-collar clamp 35. With this connection, the ratchet gear 28 is biased by the tension spring 38 in the direction of rotation of the output shaft 24 of the timer motor 11 (FIG. 3). When the spring 38 is extended the follow-up arm 65 is just touching the trailing edge of the triangle 29.

As shown in FIG. 6, the ratchet wheel 47 includes different rim portions 48 and 49 about the central aperture 51 and a plurality of circumferentially-spaced upstanding posts 52 near the edge of the ratchet wheel 47. The upstanding posts 52 extend in the direction of the dial 41 (FIGS. 1, 2 and 3) and their purpose is best explained in connection with FIG. 7.

In FIG. 7, there is shown presettable timer switch assembly 13 illustrating the relationship between the ratchet gear 28, the ratchet wheel 47 and the push-button switch 14. As best shown in this view, there are 10 upstanding posts 52A–52J corresponding in angular position about the central aperture 51 and the ratchet wheel 47 to the finger apertures 46A–46J (FIGS. 1 and 2) of the dial 41.

The posts 52A–52J are 24° apart, center-on-center, and spaced around 240° of the circumference of the ratchet wheel 47 indicated at 49, with the remaining portion of the circumference shown at 48 covering the remaining 120° of the circumference of the ratchet wheel 47. The portion 49 has a plurality of shallow notches 40A–40J in its rim and the portion 48 has a deeper notch 67 in its rim. The shaft 25 is tightly engaged in the aperture 51 so that the motion of the dial 41 by a user moves the posts 52A–52J through an angle corresponding to the dialed distance of the dial 41.

The ratchet gear 28 is positioned with the triangular portions 29 and 30 in the line of movement of the posts 52A–52J and the shaft 24 spaced from the ratchet wheel 47. As shown in FIG. 7, the shaft 24, when the timer has been turned on by the switch 15 and the dial 41 moved to a selected time, rotates in a clockwise direction, the ratchet gear 28 being pulled by the tension spring 38 and pushed by the follow-up arm 65 as the split-collar 35 rotates.

When the dial 41 (FIGS. 1, 2 and 3) is in its rest position, the push-button switch has the rotating wheel of its actuator arm in deeper notch 67 of the ratchet wheel 47 and, when the dial 41 is set to time an "off" period for a commercial, the switch 14 has the wheel 71 of its actuator arm resting against the portion 49, being held in notches 40A–40J, which momentarily holds the wheel in position to stop it from moving too far as a result of inertia. For this purpose, the switch 14 is positioned at a fixed location adjacent to the ratchet wheel 47 with its wheel in such a position that the switch 14 is closed when it is within the notch 67 of portion 48 and open when it is against the notches 40A–40J of the rim portion 49.

Before using the timer 10, the power is turned on. The push-button switch 14 has its roller is within the notch 67 and thus closed by the extension of its actuator arm. This causes power to be applied to the television set. The lamp 16 is also illuminated since it is in circuit with the motor 11 when the switch 15 is closed.

In operation, the user dials the period of time that he believes the commercial will last, causing the ratchet wheel 47 to be turned to a corresponding period of time and the output shaft 24 (FIG. 7) to rotate in a clockwise direction under the control of the one-rpm synchronous motor 11 (FIG. 3). When the ratchet wheel 47 has been turned from its rest position the switch 14 is opened and the television set is turned off. The ratchet gear 28 then turns the ratchet wheel 47 back to its original position after the elapse of the preset time causing the push-button switch 14 to be closed and the television set to be turned back on.

To set the time of the commercial into the timer 10, the user inserts his finger into a selected one of the finger apertures 46A–46J (FIGS. 1 and 2) in the dial 41 and dials against the dial stop 43. The finger aperture is selected to correspond to what the user believes the time of the commercial to be.

Since the ratchet wheel 47 and the dial 41 (FIG. 3) are mounted to the same shaft 25 (FIG. 3) the ratchet wheel 47 is turned through the same angle as the dial 41. As it turns, certain of the posts 52A–52J are moved against and past the ratchet gear 28, hitting the side of one of the triangles 29 and 30. The dial 41 may only be turned when the follow-up arm 65 is not holding the ratchet gear 28 in position to resist movement of the posts.

During a portion of each revolution of the motor 11, the ratchet gear 28 is positioned so that the dial 41 may be turned without any of the posts 52A–52J striking the ratchet gear. However, if the ratchet gear is positioned in the path of the posts but the follow-up arm 65 is not holding it, the ratchet gear will be moved to permit the posts to pass it.

Each time one of the posts 52 hits the side of a triangle 29 or 30, the ratchet gear 28 is pulled against the bias of the spring 38 to permit the post 52 to pass the ratchet gear 28. This continues until a number of posts 52 have been moved past the ratchet gear 28 corresponding to the number of the finger apertures 46A–46J into which the user has placed his finger to dial the appropriate amount of time. After the dialing has been completed both the dial 41 and the ratchet wheel 47 are positioned an angular distance from their common starting position which corresponds to the period of time that the television set is to remain off.

The television set remains off because the roller of the push-buttom switch 14 is held in a position by the rim portion 48 of the ratchet wheel 47 which opens the switch 14 when the user dials the time. In this set position, the ratchet wheel 47 is located clockwise from the rest position a distance proportional to the time the television set is to be off. The position adjacent to the wheel 47 of the roller at this time also corresponds to the distance from the notch 67 that represents the time for which the television set is to remain off.

To cause the television set to be turned back on after the preset time has elapsed, the motor 11 (FIG. 3) turns its output shaft 24 (FIGS. 3, 5 and 7) at such a speed that the triangles 29 and 30 of the ratchet gear 28 engage a different one of the posts 52A–52J each half minute. The triangles of the ratchet gear 28 have a sufficient length in relation to the distance that the posts 52A–52J are spaced from each other so that each of the triangles engages a different one of the posts 52A–52J each revolution.

The ratchet wheel 47 is moved one post at a time until it is turned back to a position where no posts are engaged by the triangles of the ratchet gear 28 at which position the triangles of the ratchet gear are within the 120° portion of the ratchet wheel not having posts, which in the preferred embodiment corresponds to the rim portion 48 and the motor is off. In this position, the notch 67 permits the roller of the switch 14 to move outward to again turn on the television set. During the return of the ratchet wheel 47, the roller of the push-button switch 14 contacts the rim of the ratchet wheel 47 resting at notches 40A–40J to aid in holding the ratchet wheel 47 in position until contacted by a triangle of the ratchet gear 28.

To permit the ratchet gear 28 to turn the wheel, the distance from the center of the aperture 32 (FIG. 4) to the tip of each triangle must be larger than a distance which is calculated as follows. That distance is the square root of two other numbers. One of those numbers is obtained by squaring half the distance between any two adjacent ones of the posts 52A–52J. The other number is determined by squaring the shortest distance between the center of the aperture 32 and a line drawn between any two adjacent ones of the posts 52A–52B. In other words, the second number is the square of the length of a perpendicular from the center of the aperture 32 to a line between two of the posts 52A and 52B which are spaced equal distances from the center of the aperture 32 so that perpendicular bisects that line and passes through the center of the aperture 51.

When the one-rpm motor 11 has rotated a sufficient number of times to return the notch 67 to a position where it receives the roller of the switch 14, the television set is again turned on. Of course, if a faster motor is used, the time between the apertures 46A–46J will be less and the time period must be adjusted. Generally, the speed of the motor in revolutions per minute divided by the number of teeth on the ratchet wheel and the number of posts between openings in the dial will yield the number of minutes delay provided by each successive ones of the openings in the dial.

The spring 38 must be sufficiently strong to turn the ratchet gear 28 to a position where the follow-up arm 65 forces the ratchet gear 28 and ratchet wheel 47 forward each time the motor turns. It must have sufficient resilience on the other hand so that it will not move the ratchet gear while the ratchet gear is against the posts. If it is too stiff it will on occasion spin the ratchet gear or twist itself around the shaft of the motor from backlash. When the dial is at rest after a timing period the ratchet gear 28 is preferably positioned so that the posts move past it without touching it. It must be positioned at this time so that the roller of the switch is in the off notch 67 and the arm 65 does not hold the gear in a position where it contacts the posts as the dial is turned.

In FIG. 8, there is shown a schematic circuit diagram of the timer. As shown in this diagram, the mains power supply 60 is connected to the timer motor 11 and to the television set 62 through two conductors, which may be the conductors in an ordinary electric cord such as are usually used for television sets.

A first of the conductors is connected directly from the mains power supply 60 to the television set 62, to the lamp 63 through current limiting resistor 69 and to one input of the timer motor 11. The other conductor is electrically connected through the manual single-pole, double-throw toggle switch 15 either: (1) through one path to one input of the push-button two-way switch 14 and through a second parallel path through the lamp 16 back to the first conductor from the mains power supply so that, when switch 15 is closed, power is supplied to the input terminal of the switch 14 and to the lamp 16; or (2) through lamp 63 and resistor 69 to the mains power supply 60.

The push-button switch 14 has its normally opened contact electrically connected to the other input terminal of the television set 62 and its normally closed contact electrically connected to the second input of the motor 11 so that, when the roller of the push-button switch 14 is pushed outwardly into notch 67 by its actuator arm (FIG. 7), the television set 62 has power applied to it but when the roller is forced inwardly by rim portion 48 (FIG. 7) power is applied to the motor 11 and is disconnected from the television set 62.

The switch 14 may be any type of a snap-action, pushbutton single-pole, double-throw switch. Suitable types are sold by Minneapolis-Honeywell under the trademark of Microswitch. As can be understood, other types of switches can be used together with other ratchet-cam wheel configurations. For example, the ratchet-wheel 47 could have larger and smaller diameter portions at 48 and 49 rather than a deep notch and shallow notches. Moreover, raised and lowered portions can be interchanged provided a compensating change is made in the switch.

As can be understood from the above description, the timer of this invention is simple in construction and easy to operate. It provides a convenient manner of disconnecting a television set or radio or the like during a selected commercial at the convenience of the user without his finding it necessary to turn the set back on at the end of the selected period of time.

Athough a specific embodiment of the invention has been described with some particularity, many modifications and variations in the invention are possible within the light of the above teachings. It is therefore to be understood that, within the scope of the appended claims, the invention may be practiced other than as specifically described.

What is claimed is:

1. Timing apparatus for disconnecting electrical equipment for a selected period of time, comprising:

switch means for electrically disconnecting a television set when in a first position and electrically connecting a television set when in a second position;

manually movable means having a rest position and a plurality of off-set positions for selecting a time related to the distance of said manually movable means is off-set from said rest position;

said manually moving means including means for controlling said switch means to open said switch means when said manually movable means is off-set from said rest position and to close said switch means when said manually movable means is returned to said rest position;

drive means for returning said manually movable means to said rest position at a fixed rate, whereby said off-set position determines the time said switch means is open;

said drive means including an electric timing motor and a ratchet gear;

said electric timing motor driving said ratchet gear;

said manually movable means comprising a dial member and a driven member mounted for rotation together;

said dial member being adapted to be moved in a first direction by an operator; and said driven member including projections positioned to be engaged by said ratched wheel as said ratchet wheel rotates.

2. Timing apparatus according to claim 1 in which:

said timing apparatus further includes a front panel;

said dial member being mounted outside said panel; and said driven member being mounted behind said panel and connected to said dial member by a shaft for rotation therewith.

3. Timing apparatus according to claim 2 in which:

said timing apparatus further includes an on-off switch and an indicator light; and said on-off switch includes means for interrupting current to said indicator light and to said electric timing motor in one position and connecting current to said indicator light and timer motor in another position.

4. Timing apparatus according to claim 3 in which:

said driven member includes cam means for closing said switch means when said manually movable means is in said rest position and opening said switch means in certain other positions; and said cam means and drive means are engaged and disengaged through said ratchet wheel for enabling said timing motor to return said manually movable means to said rest position.

5. Timing apparatus according to claim 4 in which said dial member comprises:

a circular means;

said circular means having a series of ten apertures therethrough;

said apertures being on a centrally located circle; and said circular means being mounted for rotation outside of said panel.

6. Timing apparatus according to claim 5 in which:

said driven member includes a cam plate and a plurality of posts;

said plurality of posts being positioned around the periphery of said cam member, whereby said ratchet wheel engages said post to rotate said cam plate;

said cam plate having a plurality of depressions along its perimeter;

said switch means including a push-button switch having its actuator arm positioned in the path of the perimeter of said cam plate, whereby said switch actuator arm is biased into said depressions;

one of said depressions being deeper than the other of said depressions; and said actuator arm and said one depression being positioned so that said actuator arm is in said one depression when said movable means is in said rest position.

7. Timing apparatus according to claim 1 in which:

said driven member includes cam means for closing said switch means when said manually movable means is in said rest position and opening said switch means in certain other positions; and said cam means and drive means being engaged and disengaged through said ratchet wheel for enabling said timing motor to return said manually movable means to said rest position.

8. Timing apparatus according to claim 7 in which said dial member comprises:

a circular means;

said circular means having a series of ten apertures therethrough;

said apertures being on a centrally located circle; and said circular means being mounted for rotation outside of said panel.

9. Timing apparatus according to claim 8 in which:

said driven member includes a cam plate and a plurality of posts;

said plurality of posts being positioned around the periphery of said cam member, whereby said ratchet wheel engages said post to rotate said cam plate;

said cam plate having a plurality of depressions along its perimeter;

said switch means including a push-button switch having its actuator arm positioned in the path of the perimeter of said cam plate, whereby said switch actuator arm is biased into said depressions;

one of said depressions being deeper than the other of said depressions; and said actuator arm and said one depression being positioned so that said actuator arm is in said one depression when said movable means is in said rest position.

10. Timing apparatus according to claim 2 in which said dial member comprises:

a circular means;

said circular means having a series of ten apertures there through;

said apertures being on a centrally located circle; and said circular means being mounted for rotation outside of said panel.

11. Timing apparatus according to claim 10 in which:

said driven member includes a cam plate and a plurality of posts;

said plurality of posts being positioned around the periphery of said cam member, whereby said ratchet wheel engages said post to rotate said cam plate;

said cam plate having a plurality of depressions along its perimeter;

said switch means including a push-button switch having its actuator arm positioned in the path of the perimeter of said cam plate, whereby said switch actuator arm is biased into said depressions;

one of said depressions being deeper than the other of said depressions; and said actuator arm and said one depression being positioned so that said actuator arm is in said one depression when said movable means is in said rest position.

* * * * *